(12) United States Patent
Humphrey et al.

(10) Patent No.: US 7,542,850 B2
(45) Date of Patent: Jun. 2, 2009

(54) METHOD AND SYSTEM FOR SYNCHRONIZING GEOPHYSICAL SURVEY DATA

(75) Inventors: David Humphrey, Houston, TX (US); John Brett, Kinnelon, NJ (US)

(73) Assignee: Bell Geospace, Inc., Houston, TX (US)

( * ) Notice: Subject to any disclaimer, the term of this patent is extended or adjusted under 35 U.S.C. 154(b) by 673 days.

(21) Appl. No.: 10/876,157

(22) Filed: Jun. 24, 2004

(65) Prior Publication Data
US 2006/0004519 A1 Jan. 5, 2006

(51) Int. Cl.
*G01V 3/00* (2006.01)
*G01V 3/16* (2006.01)
(52) U.S. Cl. .......................................... 702/2; 324/330
(58) Field of Classification Search .................. 702/2, 702/5, 1; 382/284; 342/191, 351, 357.17; 348/116; 73/178 R; 701/200, 213, 214, 701/220, 223; 324/330, 331
See application file for complete search history.

(56) References Cited

U.S. PATENT DOCUMENTS

| | | | | |
|---|---|---|---|---|
| 4,435,981 A | * | 3/1984 | Carson et al. | 73/382 R |
| 4,686,474 A | * | 8/1987 | Olsen et al. | 324/331 |
| 5,266,799 A | * | 11/1993 | Steinitz et al. | 250/253 |
| 5,282,132 A | * | 1/1994 | Trout | 702/5 |
| 5,339,684 A | | 8/1994 | Jircitano et al. | 73/178 R |
| 5,357,802 A | | 10/1994 | Hofmeyer et al. | 73/382 G |
| 5,359,889 A | | 11/1994 | Jircitano et al. | 73/178 R |
| 5,596,494 A | * | 1/1997 | Kuo | 702/2 |
| 5,614,913 A | * | 3/1997 | Nichols et al. | 342/357.12 |
| 5,652,717 A | * | 7/1997 | Miller et al. | 703/6 |
| 5,661,649 A | * | 8/1997 | Carson et al. | 702/2 |
| 5,894,323 A | * | 4/1999 | Kain et al. | 348/116 |
| 5,922,951 A | | 7/1999 | O'Keefe et al. | 73/382 G |
| 5,986,604 A | * | 11/1999 | Nichols et al. | 342/357.12 |
| 6,278,948 B1 | | 8/2001 | Jorgensen et al. | 702/6 |
| 6,804,608 B2 | * | 10/2004 | Lee et al. | 702/5 |
| 6,837,106 B2 | * | 1/2005 | Etkin et al. | 73/382 G |

(Continued)

FOREIGN PATENT DOCUMENTS

WO WO 02/103398 12/2002

(Continued)

OTHER PUBLICATIONS

Jekeli, C., A Review of Gradiometer Survey System Data Analysis, Apr. 1993, Geophysics, vol. 58, No. 4, pp. 508-514.*

(Continued)

*Primary Examiner*—Edward R Cosimano
*Assistant Examiner*—Toan M Le
(74) *Attorney, Agent, or Firm*—McDonnell Boehnen Hulbert & Berghoff LLP

(57) ABSTRACT

A method and system for synchronizing geophysical survey data is provided. Detection of geophysically significant subsurface anomalies potentially associated with ore bodies or hydrocarbon deposits can be made by vehicle mounted surface or airborne regional gravitational studies. Recorded geophysical survey data is processed to synchronize data collected by various sensors. Data from the various sensors is synchronized based on position coordinates corresponding to locations where the data was collected. In this manner, at one specific location on Earth, the electromagnetic reading, magnetometer reading, gravimeter reading, and altimeter reading can all be associated together so that many characteristics of the specific location can be identified.

27 Claims, 12 Drawing Sheets

U.S. PATENT DOCUMENTS

| | | | | |
|---|---|---|---|---|
| 6,954,698 | B2* | 10/2005 | Tryggvason | 702/5 |
| 7,222,020 | B2* | 5/2007 | Knight et al. | 702/2 |
| 7,365,544 | B2* | 4/2008 | McCracken et al. | 324/330 |
| 2003/0033086 | A1 | 2/2003 | Lee et al. | 702/5 |
| 2005/0017721 | A1* | 1/2005 | McCracken et al. | 324/330 |

FOREIGN PATENT DOCUMENTS

| WO | WO 03/032015 | 4/2003 |
|---|---|---|
| WO | WO 03/076970 | 9/2003 |

OTHER PUBLICATIONS

Brzezowski et al., Gravity Gradiometer Survey Errors, Oct. 1988, Geophysics, vol. 53, No. 10, pp. 1355-1361.*

Lee et al., High Resolution Gravity Surveys from a Fixed Wing Aircraft, 2001 IEEE, pp. 1327-1331.*

Jekeli, C., A Review of Gradiometer Survey System Data Analysis, Apr. 1993, Geophysics, vol. 58, No. 4, pp. 508-514.*

Minty et al., Merging Airborne Magnetic Surveys into Continental-Scale Compilations, May-Jun. 2003, Geophysics, vol. 68, No. 3, pp. 988-995.*

Jubeli et al., Merging Airborne and carborne Radiometric Data for Surveying the Deir Az-Zor Area, Syria, 1997, Appl. Radiat. Isot., vol. 48, No. 5, pp. 667-675.*

Liu et al., Detecting Kimberlite Pipes At Ekati With Airborne Gravity Gradiometry, Aug. 2001, ASEG 15th Geophysical Conference and Exhibition.*

International Search Report for PCT/US05/21062, Apr. 28, 2006.

* cited by examiner

| Time | Position Data | | Gradiometry Data | | | | | | | Magnetometer Data | | | |
|---|---|---|---|---|---|---|---|---|---|---|---|---|---|
| | Lon | Heading | Gxx | Gxz | Gxy | Gyy | Gyz | Gzz | Total Field | Inclination | Declination | TMI |
| 732441525 | -11.6117 | 1.484552 | 31.63 | -58.6 | -5.39 | -22.33 | -35.54 | -9.3 | 32648 | 5.9 | -6.9 | 32621.9 |
| 732441526 | -11.6112 | 1.476698 | 20.79 | -62.22 | -26.34 | 12.25 | -28.3 | -33.04 | 32648 | 5.9 | -6.9 | 32622.9 |
| 732441527 | -11.6107 | 1.481061 | 19.41 | -48.52 | -15.54 | 12.13 | -23.82 | -31.54 | 32648 | 5.9 | -6.9 | 32624 |
| 732441528 | -11.6101 | 1.483679 | 22.57 | -46.15 | -2.3 | -4.6 | -10.2 | -17.97 | 32648.1 | 5.9 | -6.9 | 32625.3 |
| 732441529 | -11.6096 | 1.483679 | 16.11 | -33.25 | 2.68 | 7.29 | -12.23 | -23.39 | 32648.2 | 5.9 | -6.9 | 32626.4 |
| 732441530 | -11.6091 | 1.48717 | 5.51 | -12 | 22.5 | 11.43 | -19.95 | -16.94 | 32648.2 | 5.9 | -6.9 | 32627.3 |
| 732441531 | -11.6086 | 1.47408 | 4.12 | 9.94 | 36.65 | 2.74 | -25.82 | -6.86 | 32648.2 | 5.9 | -6.9 | 32628.2 |
| 732441532 | -11.6081 | 1.471462 | 19.18 | 9.53 | 23.06 | -0.18 | -25.73 | -19 | 32648.3 | 5.9 | -6.9 | 32628.9 |
| 732441533 | -11.6076 | 1.489788 | 24.12 | -13.36 | 0.59 | -5.03 | -15.88 | -19.09 | 32648.3 | 5.9 | -6.9 | 32629.7 |

FIGURE 8

METHOD AND SYSTEM FOR SYNCHRONIZING GEOPHYSICAL SURVEY DATA

FIELD OF INVENTION

The present invention relates to methods for processing geophysical survey data, and more particularly, to a method and system for synchronizing geophysical survey data based on position coordinates corresponding to locations of data point collection.

BACKGROUND

Gravity surveying is one technique in modern exploration for mineral and petroleum commodities. For example, detection of geophysically significant subsurface anomalies potentially associated with ore bodies or hydrocarbon deposits can be made using gravity surveying techniques since the existence of gravitational anomalies usually depends upon the presence of a change in mass density associated with the deposit. For example, the gravitational anomaly of a body of ore with a density contrast of 300 kg m$^{-3}$ and a dimension of 200 m buried at a depth of 100 m is typically $2\times10^{-6}$ m/s$_2$, for example, which is 0.00002% of the normal Earth gravity field. This relatively small effect is typically measured in units of milligals (mGal), which is the unit for the free air and Bouguer gravity field measurements and is equivalent to $10^{-5}$ m/s$_2$. Thus, for the above example, the body of ore would be represented by 0.2 mGal.

Currently, many measurements have been made using instruments of the LaCoste/Romberg type that are essentially a mass (e.g., proof mass) balanced on an ultrasensitive spring that detects a difference in apparent weight caused by the change in gravity. The measurements are subject to a wide variety of environmental influences, and measurements should be performed relative to a standard point that is used regularly during the survey as a fixed reference for removal of drifts in the instrument. This procedure can be slow, and may require extensive information on local topography and geology since a normal variation of gravity with height is approximately 0.3 mGal per meter. Within moving platforms, such as aircraft, using this type of relative gravity instrument can be difficult because using precision radar altimeters and pressure sensors to achieve vertical position to as little as one meter can impose limitations on the order of a few hundred mGals on the gravity data. Also, accelerations caused by turbulence and normal flight control can cause apparent gravity changes many times larger than the measured gravity variations.

For this reason, some geophysical prospecting has progressed towards gradiometry. In principle, measurement of a gradient of a gravity field over a known baseline allows accelerations due to motion of the platform itself to be cancelled out. Gravity gradients are the spatial derivative of the gravity field, and have units of mGal over distance such as mGal/m. The standard unit of gravity gradiometry is the Eötvös (E), which is equal to 0.1 mGal/kilometer or $10^{-9}$/s$^2$ (e.g., gradient signatures of shallow Texas salt domes are typically 50 to 100 E).

Further development has led to the progression toward three-dimensional Full Tensor Gradient (3D FTG) technology, which was developed by the US Navy and later adapted to the oil and gas industry to complement seismic technology and provide an independent method of imaging around salt and basalt areas, for example. Full tensor gradiometry measures the X, Y, and Z Cartesian components of the gradient of the gravity field.

Acquisition of geophysical data requires an operator to consider the unique nature of such a high frequency, small amplitude measurement. Acquisition parameters are dictated by several factors including, for example, water depth, target depth, terrain density, geologic concerns and the type of imaging problem being modeled.

Geophysical data includes readings from a variety of sensors that are within the survey vessel. Different types of sensors include altimeters, gravimeters, electromagnetic sensors, and magnetometers, for example. At times, it may be necessary to relate or synchronize readings from one or more of the sensors. Thus, it would be desirable to receive data from one or more additional sensors within the survey vessel and to identify when and/or where the data was collected to be able to associate data recorded from one sensor with data recorded from one or more sensors.

SUMMARY

In an exemplary embodiment, a method for processing geophysical data is provided. The method includes receiving first geophysical data collected from a first geophysical sensor. Each data within the first geophysical data is associated with first position data that corresponds to a respective location where the data within the first geophysical data was collected. The method further includes receiving second geophysical data collected from a second geophysical sensor. Each data within the second geophysical data is associated with second position data that corresponds to a respective location where the data within the second geophysical data was collected. The method also includes merging the first geophysical data with the second geophysical data based on the first position data and the second position data.

In another respect, the exemplary embodiment includes receiving first geophysical data recorded from a first geophysical survey flight and receiving second geophysical data recorded from a second geophysical survey flight. Each data within the first geophysical data is associated with first position data that corresponds to a respective location where the data within the first geophysical data was collected, and each data within the second geophysical data is associated with second position data that corresponds to a respective location where the data within the second geophysical data was collected. The method further includes merging the first geophysical data with the second geophysical data based on the first position data and the second position data.

In still another respect, the exemplary embodiment may take the form of a method for processing geophysical data. The method includes collecting first and second geophysical data and associating position coordinates to each collected geophysical data point of the first and second geophysical data. The position coordinates correspond to a respective location where each collected geophysical data point was collected. The method further includes merging the first and second geophysical data based on respective position coordinates associated with the first and second geophysical data.

In yet another respect, the exemplary embodiment may take the form of a system comprising a geophysical instrument and a processing unit. The geophysical instrument system collects geophysical data of a geographical area. The data comprises first geophysical data associated with first position data corresponding to a respective location where each data within the first geophysical data was collected and second geophysical data associated with second position data corresponding to a respective location where each data within the second geophysical data was collected. The processing unit merges the first geophysical data with the second geophysical data based on the first position data and the second position data.

In still yet another embodiment, the exemplary embodiment may take the form of an aircraft comprising a strap-down inertial navigation system and a geophysical instrument system. The strap-down inertial navigation system provides navigational measurements in a frame of reference of the aircraft. The geophysical instrument system includes an inertial navigation system for providing navigational measurements in a frame of reference of the geophysical instrument system. The aircraft may include sensors to collect geophysical data, and a processor to process the data. The processor would receive navigational measurements in a frame of reference of the aircraft or system based on the type of sensor data received.

These and other aspects will become apparent to those of ordinary skill in the art by reading the following detailed description, with reference where appropriate to the accompanying drawings. Further, it should be understood that the embodiments noted herein are not intended to limit the scope of the invention as claimed.

BRIEF DESCRIPTION OF FIGURES

FIG. 8 illustrates one example of a table of merged sensor data based on position coordinates.

DETAILED DESCRIPTION OF EXEMPLARY EMBODIMENTS

In an exemplary embodiment, a method of synchronizing geophysical survey data is provided. Detection of geophysically significant subsurface anomalies potentially associated with ore bodies or hydrocarbon deposits can be made by vehicle mounted surface or airborne regional gravitational studies. Recorded geophysical survey data is processed to synchronize data collected by various sensors. In an exemplary embodiment, data from the various sensors is synchronized based on position coordinates corresponding to locations where the data was collected. In this manner, for example, at one specific location on Earth, the electromagnetic reading, magnetometer reading, gravimeter reading, and altimeter reading can all be associated together so that many characteristics of the specific location can be identified.

I. Survey Flying

A geophysical survey is conducted, using specialized instruments, by flying over a terrain of interest at a low altitude of 100 m, for example. A gravity survey flight plan usually specifies nominal ground clearances of between 80 and 120 meters, dependent upon topographic characteristics. A series of nominally parallel survey lines can be flown until the total region to be surveyed has been covered.

Figure 1:
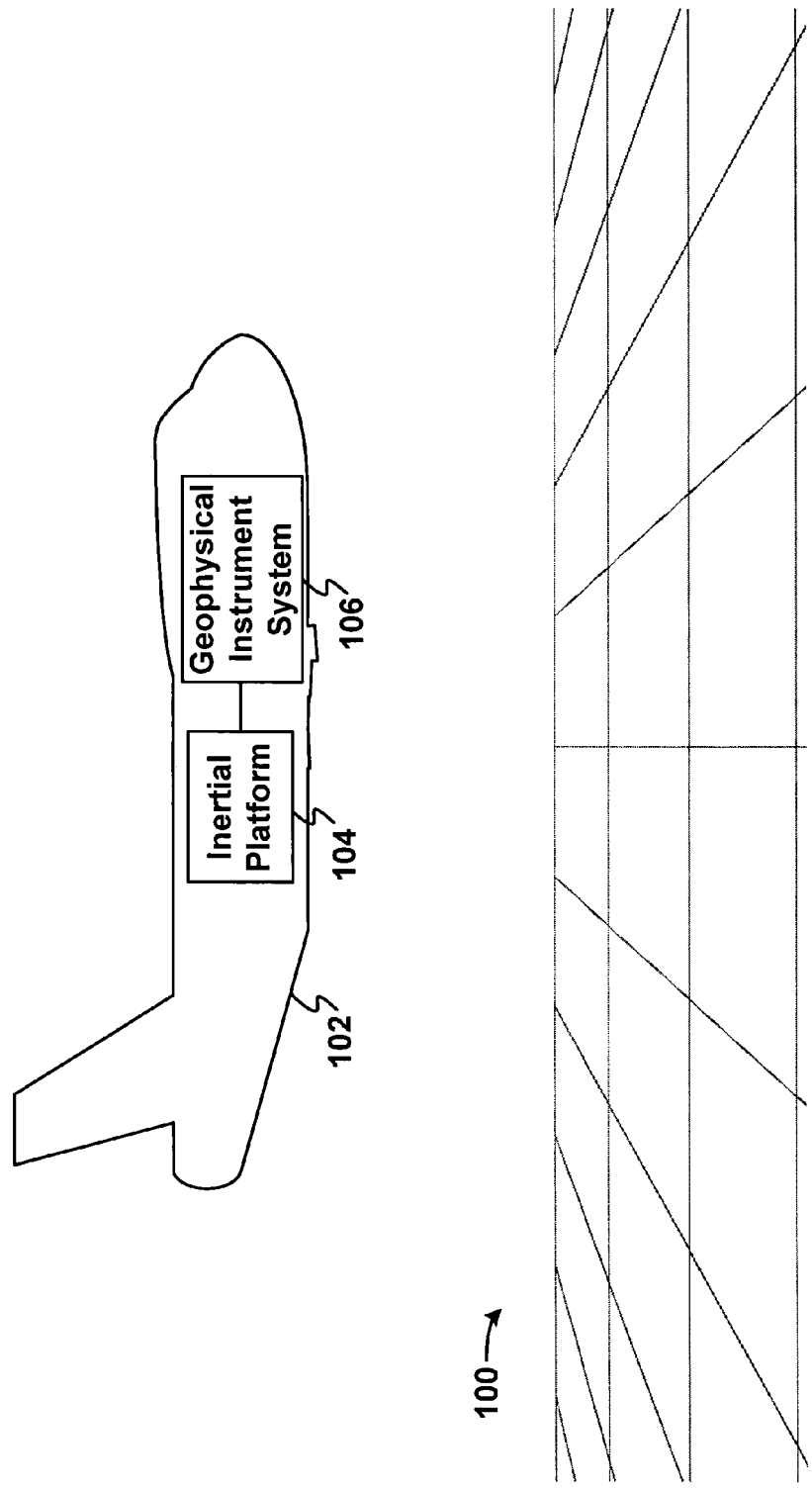
FIG. 1 illustrates one example of a conceptual survey flight.

FIG. 1 generally illustrates a conceptual survey flight. A geographic area 100 is selected for a survey, and the area can be divided into survey lines to facilitate collection of data. Also, a digital elevation map (DEM) can be created containing position data and can be used to facilitate the survey. For example, the DEM is used to calculate the topography generated gravity gradient along a survey line so that the topography generated gravity gradient can be subtracted from measured gravity gradients. This reveals gravity gradient anomalies that are not due to the topography, but rather due to potential ore bodies or hydrocarbon deposits.

Airborne geophysical measurements can be made using an aircraft 102 equipped with an inertial platform 104 and a geophysical instrument system 106. The inertial platform 104 may be any type of inertial navigation system (INS), for example. The inertial platform 104 provides measurements of the attitude (roll, pitch and heading) of the aircraft, and also possibly measurements of the acceleration, velocity, and position of the aircraft. The inertial platform 104 may include, for example, three accelerometers, and to obtain desired outputs, it is typically necessary to maintain the accelerometers pointing in a north, east, down reference frame (down is a local direction obtained with reference to gravity). The accelerometers within the inertial platform 104 output a signal that is a function of acceleration. Integrating the outputs of the accelerometers produces velocity outputs and integrating again produces position outputs.

The inertial platform 104 can be a component of the geophysical instrument system 106 that provides accurate measurements of the vertical velocity and acceleration of the geophysical instrument system 106 ten or more times per second, for example. In such a case, the inertial platform 104 is decoupled from the aircraft 102 and is in the form of a gimbaled assembly so that the inertial platform 104 provides measurements in the frame of reference for the geophysical instrument system 106.

However, as illustrated, the inertial platform 104 can also be a separate component from the geophysical instrument system 106. In such a case, the inertial platform 104 can be in the form of a "strap-down" system, which has the inertial platform 104 rigidly fixed (i.e., strapped down) to the chassis of the moving aircraft. Therefore, the strap-down system moves with the moving body. Sensors of a strap-down system experience and measure changes in reference to the body's fixed axes instead of the north-east-down reference frame. The body's fixed axes are a moving frame of reference as opposed to a constant inertial frame of reference provided with the gimbaled assembly.

Using data collected from the geophysical instrument system 106 together with position data (possibly obtained from an onboard GPS or from the inertial platform 104), the detailed trajectory that was flown by the airborne platform 102 may be determined so that the collected data can be mapped.

Figure 2:
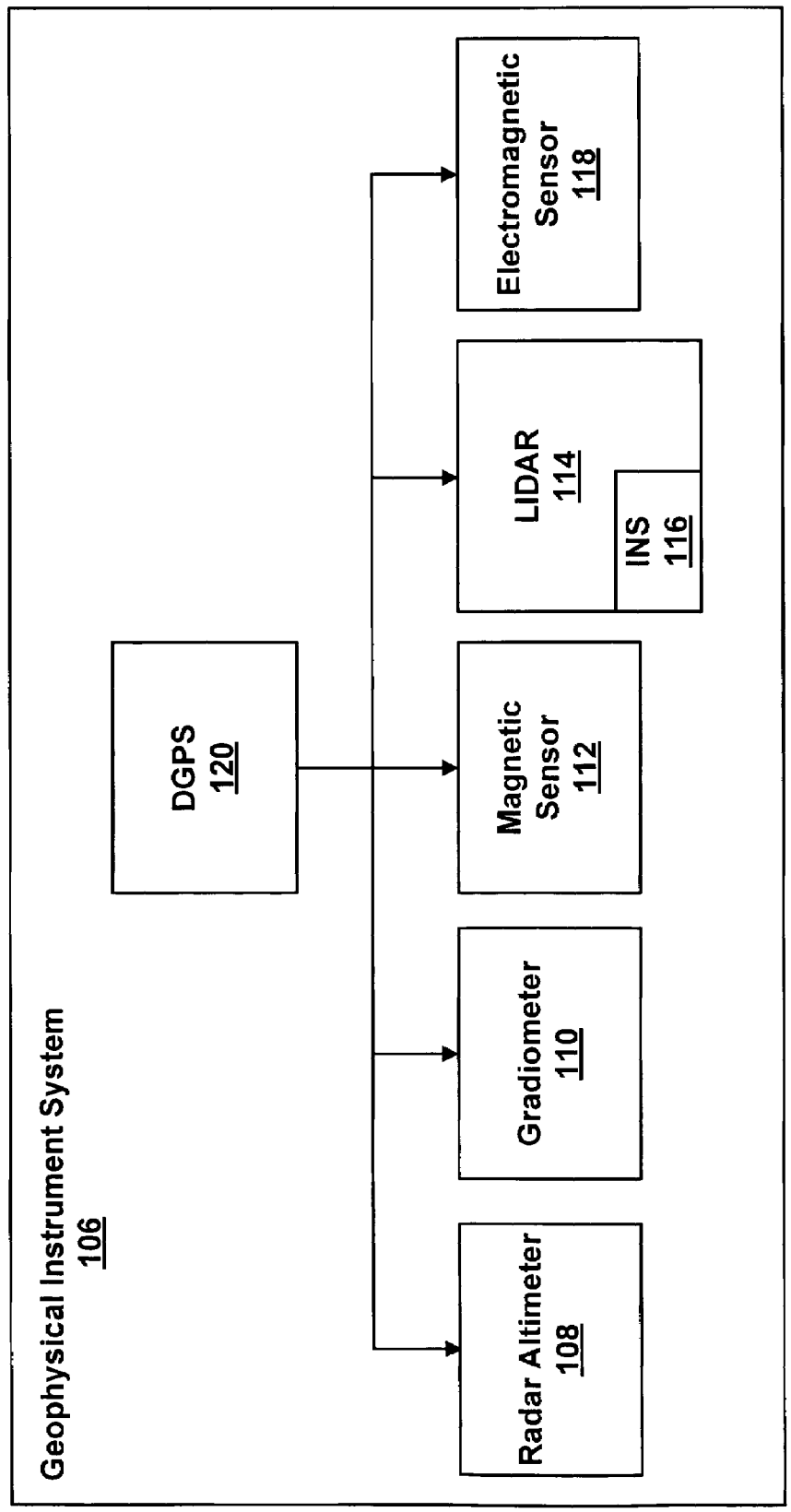
FIG. 2 is a block diagram illustrating one embodiment of a geophysical instrument system.

Different geophysical instruments may be included within the geophysical instrument system 106. FIG. 2 is a block diagram illustrating one embodiment of a geophysical instrument system 106. The system 106 includes a radar altimeter 108 that is used by the aircraft 102 to determine its height above terrain. The radar altimeter 108 determines height above terrain by using radar technology to measure the vertical distance between the aircraft 102 and terrain. The radar altimeter 108 transmits an electronic pulse in the microwave frequency to the Earth's surface. The microwave pulse reflects off the surface and returns to the sensor. Altitude is determined from the pulse travel time (from transmit to receive) and from the waveform of the returned pulse.

The system 106 also includes a gradiometer 110 that measures the spatial rate of change of the Earth's gravity field. The gravity gradiometer 110 provides a signal from which the instantaneous gradient of gravity can be derived. (Note that a measurement of gravity gradient may be preferred for detection of gravity disturbances from an airborne platform because a direct measurement of gravity may not be able to distinguish the gravity signal from accelerations of the instrument associated with the motion of the aircraft). The gravity gradiometer 110 is operable to respond to the variations in density of the rocks and minerals in the vicinity of the point below the aircraft. For example, the gravity gradiometer measures one or more components of the gradient of gravity related to a geographic area, and is expressed as the gradient of a gravity vector. For example, the gradient of the gravitational acceleration can be expressed by a symmetric tensor $G_{\mu\nu}$ defined as:

$$G_{\mu\nu} = \begin{bmatrix} Gxx & Gxy & Gxz \\ Gyx & Gyy & Gyz \\ Gzx & Gzy & Gzz \end{bmatrix} \quad \text{Equation (1)}$$

where the components of the tensor $G_{\mu\nu}$ describe the nine components of the gravity gradients and $$Gxx+Gyy+Gzz=0 \quad \text{Equation (2)}$$

G is the gravitational potential and satisfies Laplace's equation. The components Gx and Gy are the horizontal components of the gravitational vector and Gz is the vertical component. Also, the components Gxy, Gxz, Gyz, Gyy and Gzz are independent.

The system 106 further includes a magnetic sensor 112 that measures distortions and additions to the magnetic field of the Earth due to rocks and minerals below the aircraft 102. For example, the magnetic sensor 112 detects the strength and direction of a magnetic field.

In addition, the system 106 includes a light detection and ranging (LIDAR) sensor 114 that transmits light out to a target and the light interacts with and is changed by the target. Some of the transmitted light is reflected and/or scattered back to the LIDAR sensor 114 where it is analyzed. The change in properties of the light enables properties of the target to be determined. For example, the time for the light to travel out to the target and back to the LIDAR sensor 114 can be used to determine the range to the target. The readings from the LIDAR sensor 114 can be used for correction of gradients originating from the terrain, for example.

The LIDAR sensor 114 includes an inertial navigation system (INS) 116. The INS 116 may be included within the geophysical instrument system 106 to provide a strap-down INS for the system 106. For example, the LIDAR sensor 114 may be strapped-down to the aircraft 102, therefore the INS 116 is a strapped-down INS that measures changes in a moving frame of reference, e.g., the aircraft's fixed axes. Furthermore, the radar altimeter 108 and the magnetic sensor 112 may be coupled to the INS 116 to receive navigational measurements in the aircraft's frame of reference. In contrast, the gradiometer 110 may be coupled to a gimbaled INS to receive INS readings in the gradiometer's frame of reference.

The system 106 can also include an electromagnetic sensor 118 that measures the effects of electrical conductivities of rocks and minerals below the aircraft 102. The system 106 further includes a differential global positioning system (DGPS) sensor 120. DGPS is a method of providing differential corrections to a global positioning system (GPS) receiver to improve the accuracy of the navigation system. The GPS is a satellite based navigation system that provides real time position, velocity and timing information. By receiving and processing navigation data from three or more satellites, a GPS receiver can calculate its position on the Earth's surface. Using this position, one or more reference receivers at known positions can provide DGPS corrections.

The radar altimeter 108, gradiometer 110, magnetic sensor 112, LIDAR 114, and electromagnetic sensor 118 are each connected to the DGPS 120 to receive position information. Thus, these sensors in the geophysical instrument that are connected to the DGPS 120 can tag data collected during a survey with position coordinates so that an operator will have knowledge of where the data was collected.

In an alternative embodiment, each sensor in the geophysical instrument system 106 (e.g., the radar altimeter 108, gradiometer 110, magnetic sensor 112, LIDAR 114, and electromagnetic sensor 118) may include its own internal or external GPS/DGPS system. Other satellite based positioning systems such as GLONASS, Galileo, WAAS or EGNOSS can also be used.

The system 106 may include more or fewer sensors and/or components as well. For example, the geophysical instrument system 106 may include peripheral equipment, such as a system control and monitoring computer, a survey planning and tracking computer, internal GPS systems, satellite communication systems, and data processing and archival systems. When required, for marine applications, a multi-beam echo-sounder system could also be included for a swath bathymetry measurement and correction of free air gradients. In addition, some of the components of the system 106 can be combined into one component, such as including the gravity gradiometer 110 within a Full Tensor Gradient (FTG) instrument, which can perform the functions of the geophysical instrument 106 and the inertial platform 104. It should be understood that this and other arrangements described herein are set forth for purposes of example only, and other arrangements and elements can be used instead and some elements may be omitted altogether. Further, many of the elements described herein are functional entities that may be implemented as hardware, firmware, or software, and as discrete components or in conjunction with other components, in any suitable combination and location.

II. Geophysical Survey Data Processing

Figure 3:
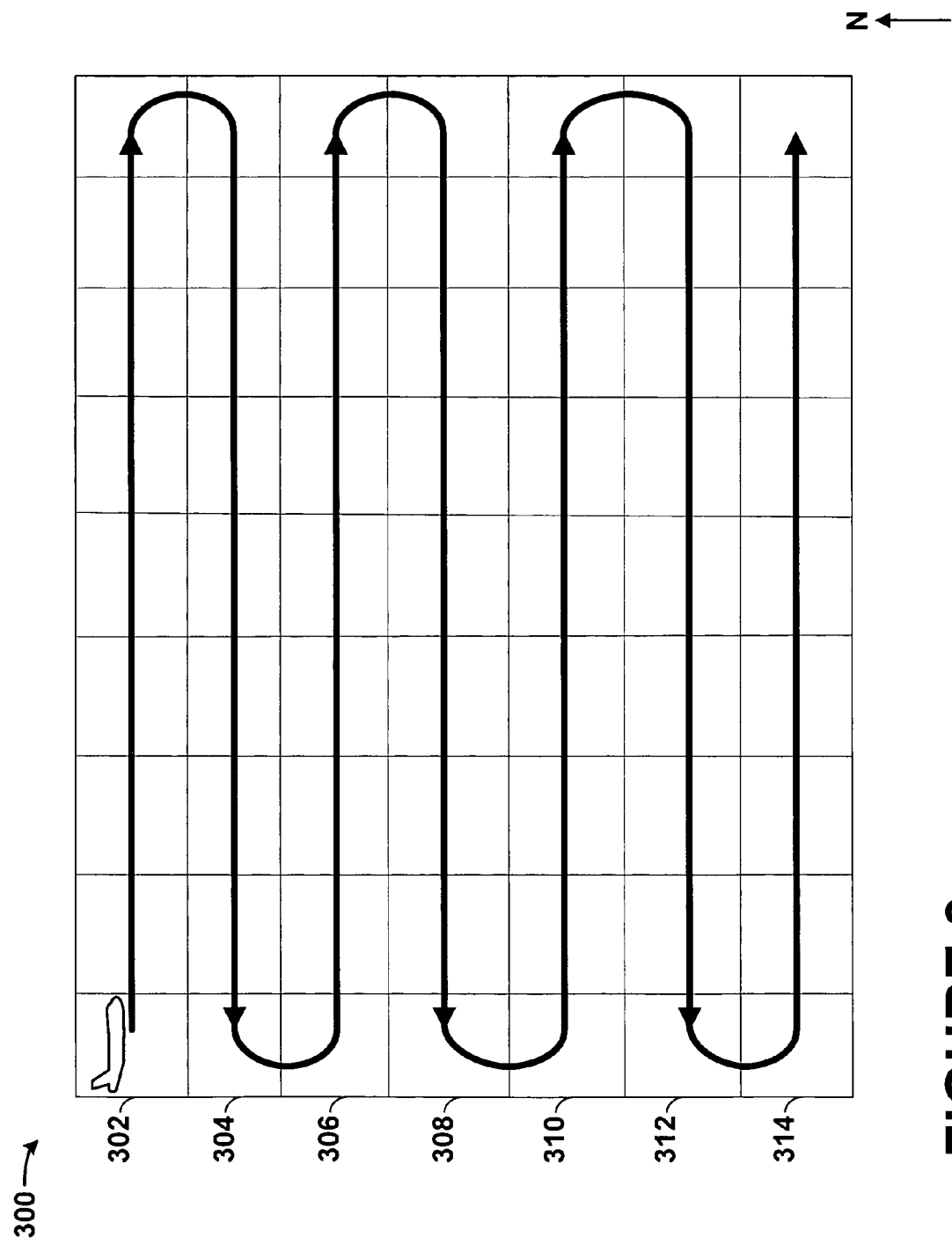
FIG. 3 illustrates one example of a survey flight pattern.

In an exemplary embodiment, geophysical data is recorded and associated with a flight trajectory that is generally a straight line. FIG. 3 illustrates one example of a survey flight pattern. A survey area 300 can be divided in a grid, resulting in seven rows 302-314 corresponding to flight paths, for example. The airplane may then fly a straight path for a certain distance to collect geophysical data along that path. Subsequently, the airplane can reverse directions to fly a substantially straight path to collect geophysical data from the terrain that is South of the first flight path. Thus, the airplane can fly in a series of nominally parallel survey lines until the total survey area 300 has been covered. In this example, the airplane flight paths progress from North to South; however, the flight paths could be configured in any manner.

Geophysical instrument data can be recorded in 400 or 800 MB files (about 1 or 2 hours of data) for archival and quality assurance checks, for example. However, more or less data can be recorded at once. The data may be recorded into respective files based on the flight paths 302-314. The data is then examined to determine whether the data meets certain quality standards. In doing so, the data may need to be synchronized such that data from various sensors collected at identified locations is associated together.

Figure 4:
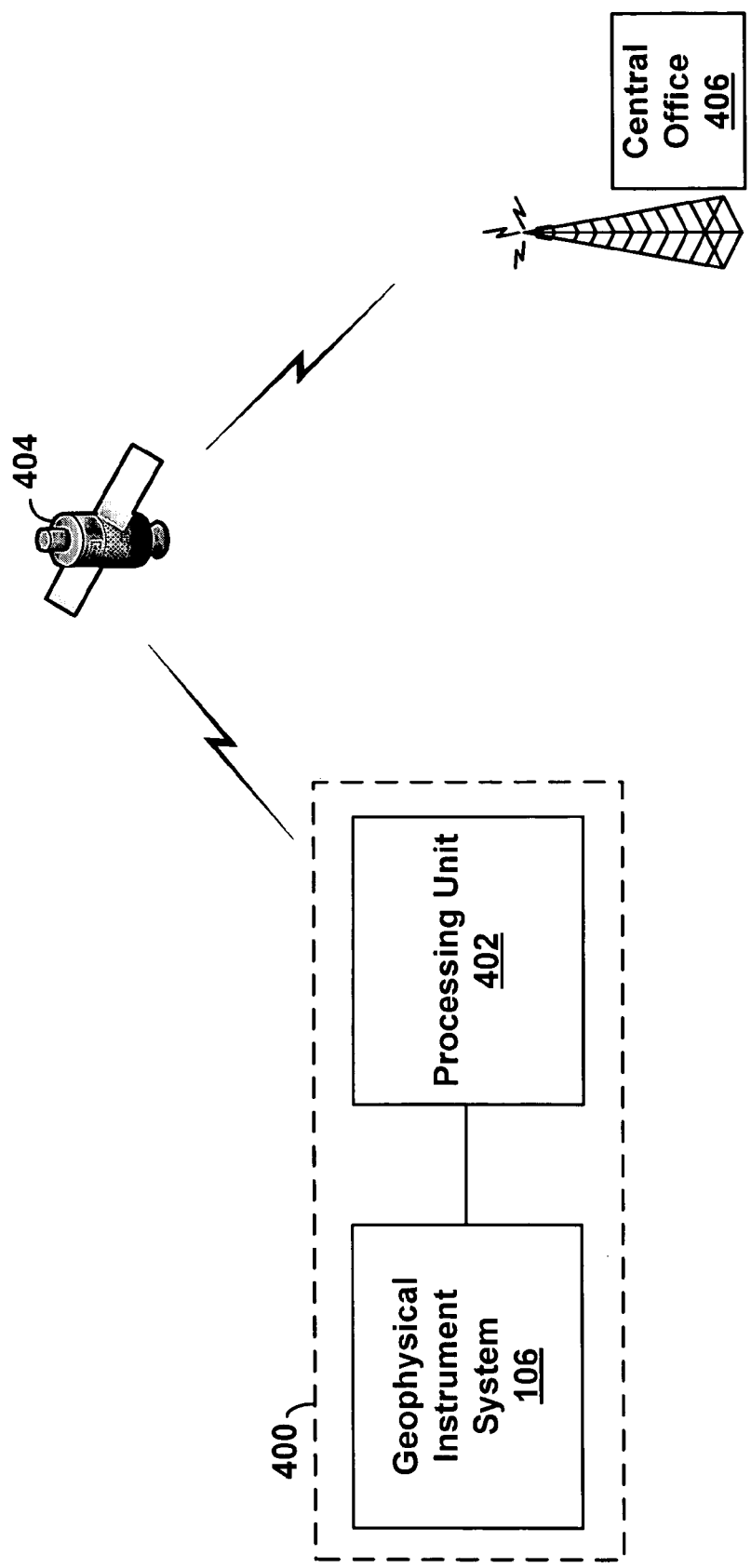
FIG. 4 is a block diagram illustrating one embodiment of a system for examining the geophysical data.

FIG. 4 is a block diagram illustrating one embodiment of a system for examining the geophysical data. The geophysical instrument system 106 and a processing unit 402 may be included within a platform 400 onboard a survey vessel to record geophysical data. As shown, the geophysical instrument system 106 can download or send the data to the processing unit 402. The processing unit 402 may be any type of computer, portable computer, or other component operable to execute appropriate software to process the data. In one embodiment, the processing unit 400 may be a component of the geophysical instrument system 106, and thus the processing unit 402 can receive and process the data accordingly. The processing unit 402 may execute software programs to synchronize data received from the sensors of the geophysical instrument system 106, for example.

Subsequently, the processing unit 402 may send the data via a satellite 404 to a central office 406. The processing unit 402 may send the data via other wireless or wired means as well. The data can be further processed and examined at the central office 404 to determine whether the data is acceptable, for example.

In another embodiment, the processing unit 402 is located at the central office 406 and the geophysical instrument system 106 sends collected data to the processing unit 402 via wireless or wired means. Alternatively, the geophysical instrument system 106 can collect data and store the data on data storage, which may include main memory within the system 106 and secondary storage. The main memory may include random access memory (RAM). Main memory can also include any additional or alternative memory device or memory circuitry. Secondary storage includes persistent long term storage, such as read only memory (ROM), optical or magnetic disks, compact-disc read only memory (CD-ROM), or any other volatile or non-volatile storage systems. The processing unit 402 can then read the data from the data storage and then examine and process the data as desired.

III. Data Synchronization

Figure 5:
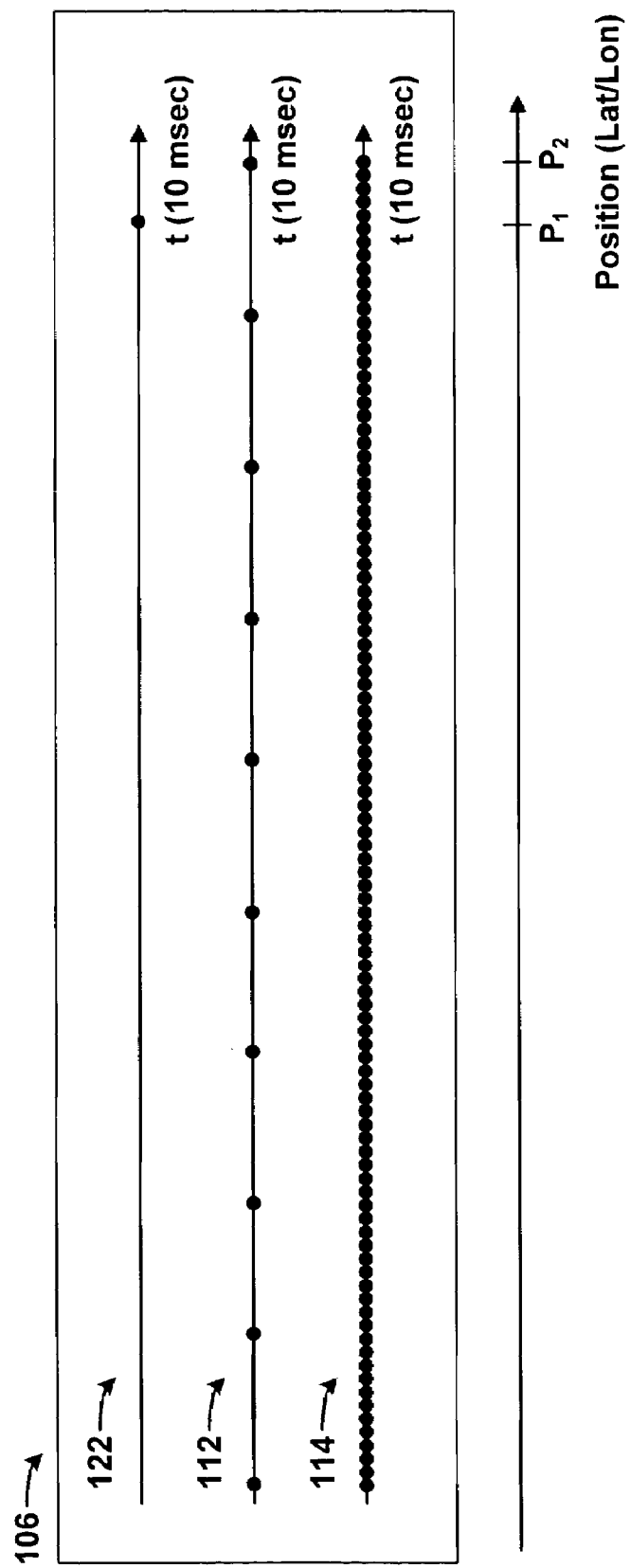
FIG. 5 illustrates one example of data collection by different sensors in the geophysical instrument.

Referring back to FIG. 3, geophysical instrument data is collected and recorded into respective files based on the flight paths 302-314. The data may need to be synchronized such that data from various sensors collected at identified locations is associated together. For example, an FTG sensor records 128 readings per second. Other sensors record readings at different rates (e.g., a magnetometer may record readings at 100 per second, and a LIDAR may record approximately 10,000 readings per second). FIG. 5 illustrates data collection by different sensors in the geophysical instrument 106. For example, the LIDAR 114 collects ten readings every millisecond (msec), the magnetometer 112 collects one reading every 1 msec, and an FTG 122 collects 0.128 readings every 1 msec. The time scale in FIG. 5 represents 10 msec and each circle represents a data recording point. Thus, the LIDAR 114 is shown to collect 100 readings over 10 msec, while the magnetometer 112 collects 10 readings over 10 msec, and the FTG 122 will only collect 1 reading over 10 msec. In FIG. 5, the magnetometer 112 and the FTG 122 are not shown to be synchronized since they do not collect readings at the same time.

Also, shown in FIG. 5 is a position (e.g., in latitude/longitude) scale. The geophysical instrument system 106 collects data while traversing over a geographical area. Thus, each data reading corresponds to a particular latitude/longitude coordinate (data can also be associated with a particular altitude coordinate as well). Since the sensors do not take readings at the same increments, then a particular sensor's reading at one moment that corresponds to a specific location will need to be synchronized to the other sensor's readings. For example, as shown in FIG. 5, the FTG 122 recorded a reading at position $P_1$, and the magnetometer 112 recorded a reading at position $P_2$, while the LIDAR 114 recorded readings at many positions before $P_1$ and in the interval from $P_1$-$P_2$. All sensor readings recorded at $P_1$ and all sensor readings recorded at $P_2$ may need to be associated together so that during data processing, the data is correctly interpreted. Further, data may need to be projected from surrounding data points for positions $P_1$ and $P_2$ if a sensor did not record data at these locations.

Figure 6:
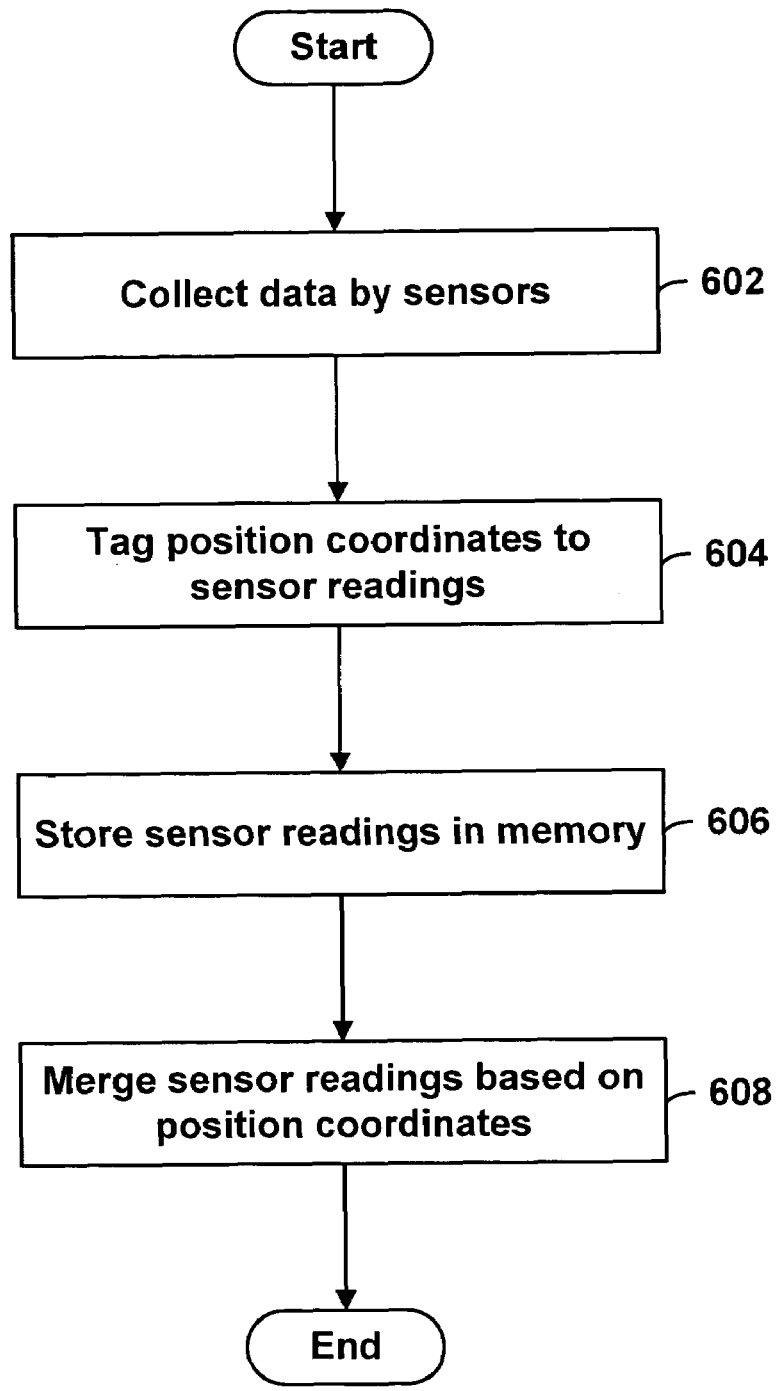
FIG. 6 is a flowchart depicting one embodiment of a method for synchronizing geophysical data recorded from the geophysical instrument system.

FIG. 6 is a flowchart depicting one embodiment of a method for synchronizing geophysical data recorded from the geophysical instrument system 106. Initially, each sensor in the geophysical instrument system 106 will collect data, as shown at block 602. Position coordinates will be tagged to each data point collected from each sensor, as shown at block 604, such that when a sensor collects a reading, the sensor can also collect a location reading. For example, when the magnetometer 112 collects a reading, this may trigger an internal processor (of the magnetometer 112 or the system 106) to access the DGPS 120 to record the instant location coordinates. Thus, the magnetometer 112 would then have a data reading and location coordinates corresponding to the location where the data reading was recorded. Thus, every time the magnetometer 112 (or other sensor of the geophysical instrument system 106) makes a recording, the magnetometer 112 will simultaneously (or approximately simultaneously) access the DGPS 120 to record the instant location coordinates associated with the recording. Thus, each sensor reading is "tagged" with position coordinates, so that when processing the data readings, an operator will know where the readings were recorded, for example.

In addition, low altitude or high altitude survey flights are desirable for collection of data from different sensors. For example, it may be desirable to collect data using the LIDAR 114 at higher altitudes than when collecting data using the gradiometer 110. Thus, in addition to recording latitude and longitude coordinates, the sensors may also record the specific altitude coordinate corresponding to the altitude at which the recording was made. The altitude may be obtaining from the radar altimeter 108 or possibly from the DGPS 120.

As shown at block 606, the sensor readings and associated position coordinates are then stored in memory. For example, the readings can be stored within internal memory of the geophysical instrument system 106, or on portable memory such as a CD. A recording and its associated position coordinates can be stored together in memory, such that the recording contains an index or pointer to its associated location coordinates.

Following, the sensors' readings are merged or associated together based on their respective position coordinates, as shown at block 608. For example, sensors' readings can be interpolated onto desired position coordinates. Since each sensor will not collect data at every possible position coordinate within a geologic survey, some readings for some sensors at particular locations will need to be extrapolated or interpolated from surrounding readings, or from readings of other sensors. In this manner, a geologic survey can be produced that includes geophysical data for any number of position coordinates. Further, the readings are merged to compare sensors outputs at the same or similar collection locations, or to correct outputs at similar collection locations, for example.

Figure 7:
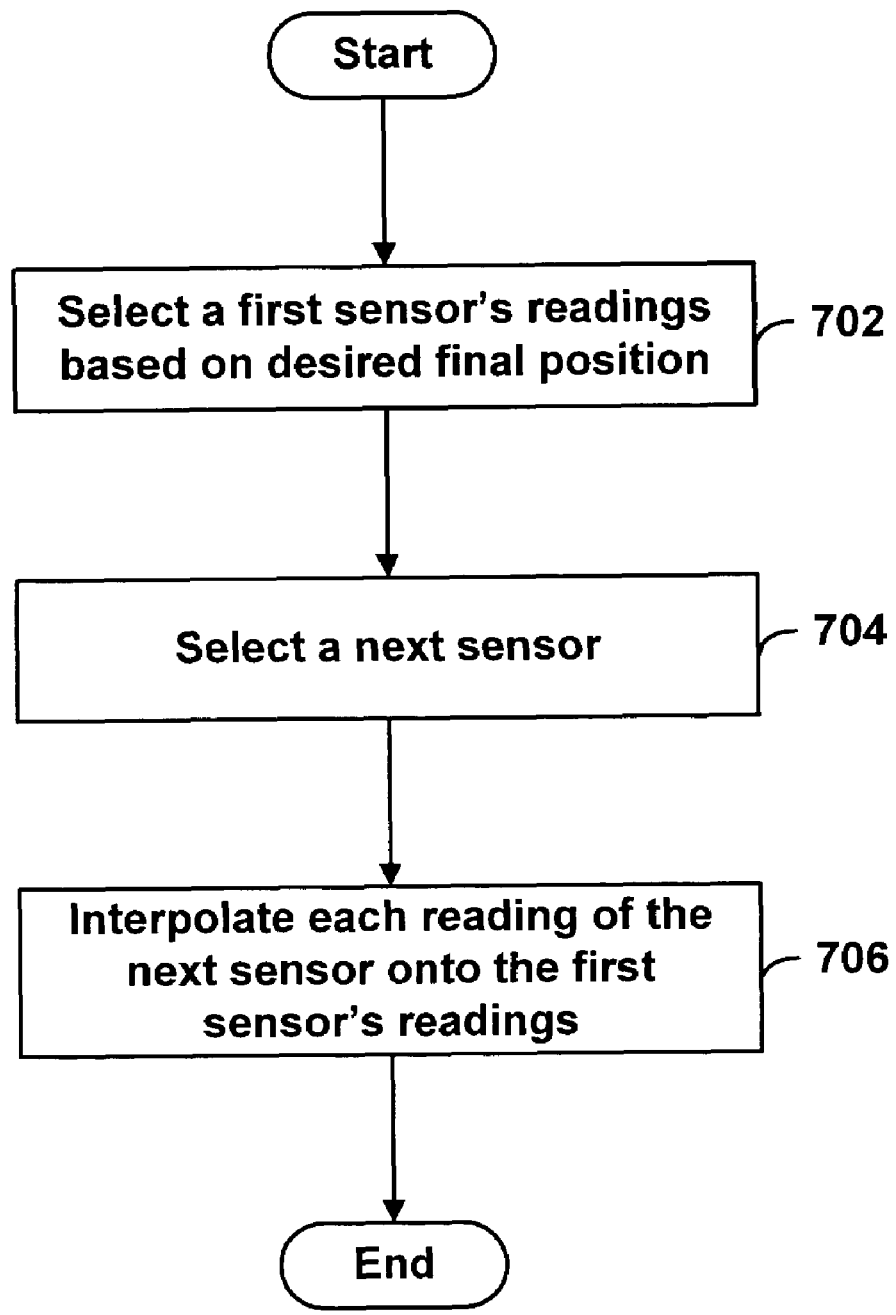
FIG. 7 is a flowchart depicting one embodiment of a method for merging data recorded from geophysical sensors.

FIG. 7 is a flowchart depicting one embodiment of a method for merging the sensors' readings. Initially, a first sensor's readings are selected based on desired final position, as shown at block 702. For example, a sensor's readings that were collected at desired position coordinates are used to set the position coordinates to which all other sensors readings are interpolated. Alternatively, readings of a first sensor could be selected for other reasons, or no reason at all (e.g., randomly).

Following, another sensor is selected, as shown at block 704. Each reading of this sensor is then interpolated onto the first sensor's readings, as shown at block 706. For example, each reading of the selected sensor is interpolated onto the desired position coordinates based on the position coordinates that were tagged to the selected sensor's readings. Interpolation is a process for estimating values that lie between known data points. Using interpolation, based on the position coordinates of the selected sensor's readings, data readings can be estimated at other coordinates as well. Thus, after interpolating the readings from all of the sensors in the geophysical instrument system 106, there will be one set of data associated with the desired position coordinates.

FIG. 8 illustrates one example of a table of merged sensor data based on position coordinates. In this example, magnetometer data collected by a magnetic sensor was merged with gradiometry data collected from a gravity gradiometer.

The gravity gradiometer may be of the type, for example, as described in U.S. Pat. No. 5,357,802 to Hofineyer, et al., entitled "Rotating Accelerometer Gradiometer," which is entirely incorporated herein by reference. The gravity gradiometer may include three instruments that each output one cross and one in-line signal. Therefore, six channels can be used in the production of a tensor dataset. As a result, the gradiometry data includes Gxx, Gxz, Gxy, Gyy, Gyz, and Gzz tensor data points.

The magnetometer data includes total field data, inclination data, declination data, and total magnetic intensity (TMI) data. The total field intensity measures the Earth's magnetic field from all directions, the inclination intensity measures the Earth's magnetic field at the angle at which the magnetic lines of the Earth's field pass through a horizontal plane on the surface of the Earth, and the declination intensity measures the Earth's magnetic field at the angle at which the magnetic lines of the Earth's field pass through a vertical plane on the surface of the Earth.

The resulting table in FIG. 8 includes data synchronized based on position coordinates, such as a longitude coordinate corresponding to a location where the data was collected and a heading measurement corresponding to the aircraft's instantaneous direction. For example, all data recorded at or interpolated at longitude −11.6117 is synchronized and displayed in the table. In this example, the sensor data is also synchronized based on time data (discussed more fully below).

Figure 9:
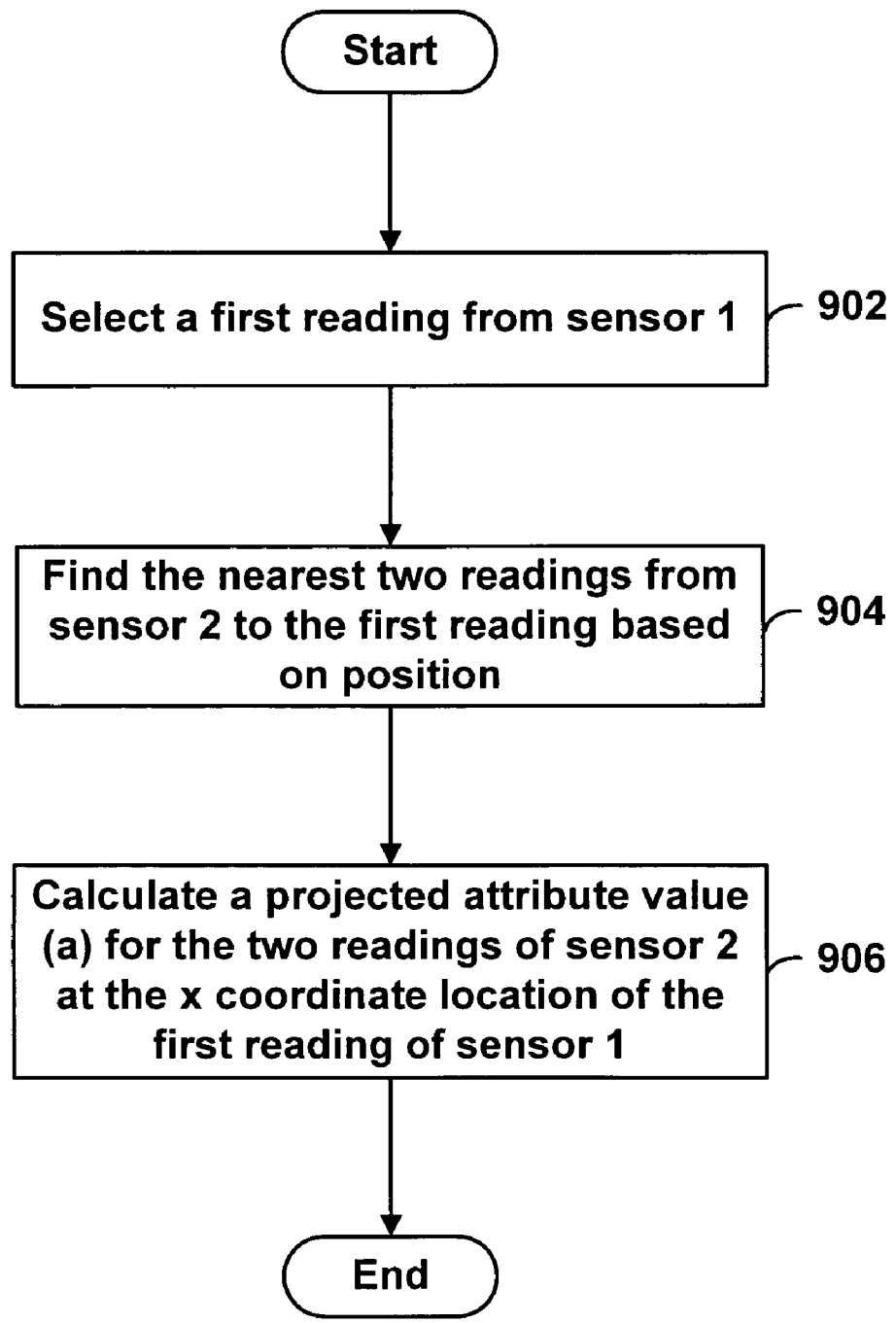
FIG. 9 is a flowchart depicting one embodiment of a method for interpolating readings of the sensors onto desired coordinate positions.

FIG. 9 is a flowchart depicting one embodiment of a method for interpolating readings of the sensors onto desired coordinate positions. Initially, a reading from the first sensor is selected, as shown at block 902. The location coordinates corresponding to the location where the reading was taken are noted. Readings from a second sensor are then compared to the selected reading. For example, the nearest two readings to the selected reading based on their respective position coordinates are identified, as shown at block 904. The nearest two readings can be found based on distances between the collection locations of the readings. To select the nearest two readings, all readings from the first sensor and the second sensor can be graphed based on their respective position coordinates. In this manner, the closest two readings from the second sensor to the selected reading based on distances between recordation coordinates will be identified as the nearest two readings.

Each attribute of the nearest two readings from the second sensor is then interpolated at the location coordinates of the reading of the first sensor. For example, each sensor may record multiple data readings or attributes at each collection location. An altimeter typically records data corresponding to GPS week, GPS second of the week, latitude, longitude, altitude above ellipsoid (e.g, a measurement independent of that produced by the gradiometer), and altitude above terrain; a gradiometer records data corresponding to the six tensors (e.g., Gxx, Gxz, Gxy, Gyy, Gyz); and a magnetometer records data corresponding to total field, inclination, declination, and total magnetic intensity, for example.

Figure 10:
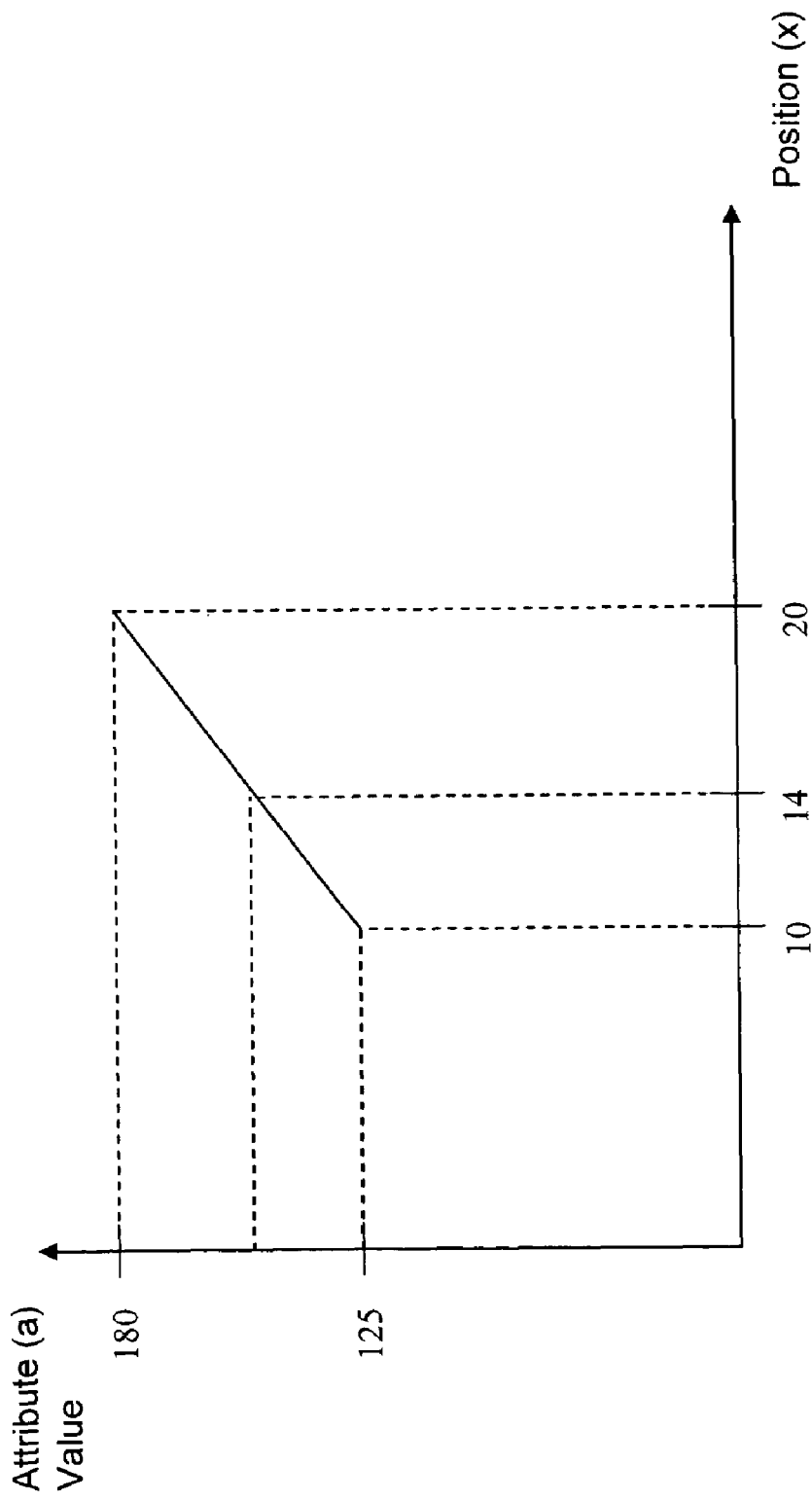
FIG. 10 graphically illustrates one example of the method for interpolating as described in FIG. 9.

As shown at block 906, all attributes of the second sensor are interpolated at the location coordinates of the reading of the first sensor by projecting an attribute value (a) for the two readings of the second sensor at the x coordinate location of the first reading of the first sensor. The data points can be interpolated using a linear interpolation in an (x,a) plane (x for position and a for attribute). For example, using the nearest two readings of the second sensor and the first reading from the first sensor, the data of the second sensor can be interpolated at the first reading collection point using Equation (3) below:

$$a = a_1 + \frac{(a_2 - a_1)(x - x_1)}{x_2 - x_1} \qquad \text{Equation (3)}$$

where $x_1$ and $x_2$ are the coordinates of the nearest two readings, $a_1$ and $a_2$ are the recorded sensor readings or attributes at $x_1$ and $x_2$ respectively, and x is the x coordinate of the first reading (e.g., the location at which the readings will be interpolated). Thus, for example, the two points (10, 125) and (20,180) interpolated at an x coordinate position of x=14 yields the coordinates (14,147). FIG. 10 graphically illustrates this interpolation example. Therefore, the attribute values of 125 and 180 are interpolated to be attribute value 147 at x coordinate 14. The attribute values may represent any of the measurements discussed above depending on the type of sensor.

It should be understood that other methods of interpolation may also be used. The linear interpolation method illustrated is only one example.

In alternate embodiments, geophysical data recorded from the geophysical instrument system 106 can be synchronized based on position coordinates and time stamps. For example, if the data that is being synchronized was collected from sensors that were all within the same survey collection vessel, then at any given point in time, the sensors will all be collecting data from the same (or approximately the same depending on the accuracy level desired) collection locations. Thus, the geophysical instrument system 106 may include an internal clock, and upon collecting a reading, the system 106 will time stamp the reading (e.g., the system 106 can store the time of the recording with the recording in data storage). The readings can be time stamped using an absolute time reading. Alternatively, the readings can be time stamped using a relative time reading, since it may only be necessary to know when a particular reading was recorded in relation to other recorded readings. The readings from all the sensors can then be synchronized based on their respective time stamps as well as their position coordinates.

Figure 11:
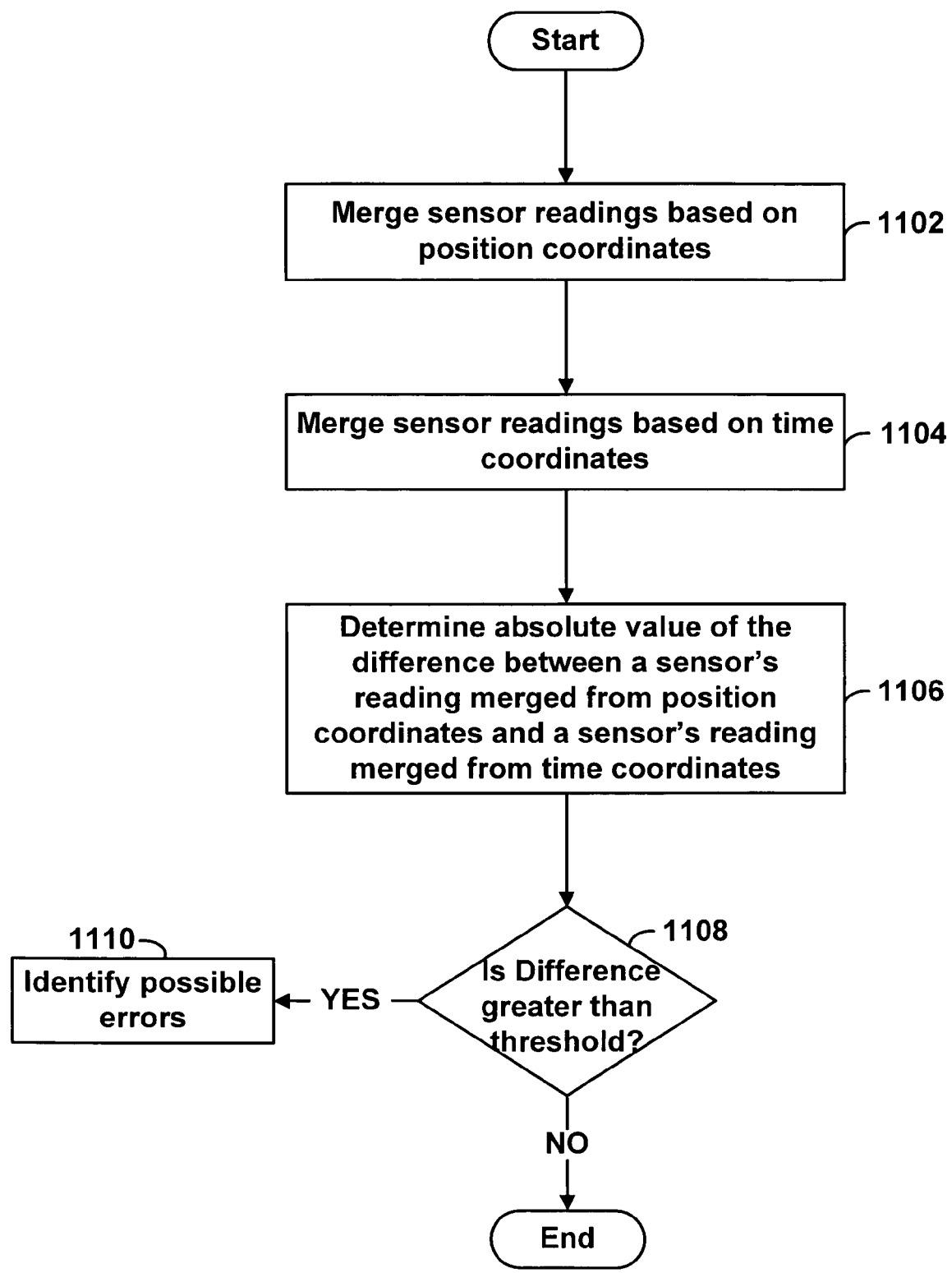
FIG. 11 is a flowchart depicting one embodiment of a method for processing geophysical data based on location coordinates and (absolute or relative) time stamps.

Using the time stamps to synchronize the data provides one example of a verification process to ensure quality of the interpolated data. FIG. 11 is a flowchart depicting one embodiment of a method for processing geophysical data based on location coordinates and time stamps. As shown at block 1102, initially the sensor readings are merged based on position coordinates to obtain a merged data set. Next, as shown at block 1104, the sensor readings are merged based on time coordinates to obtain another merged data set. Time is a scaled version of the x coordinate because all sensors are on the same aircraft and record readings at approximately the same time and position. (Note, however, that if the velocity of the aircraft is not exactly constant, then time and position will not be exactly linearly scaled versions of each other). Thus, interpolation on either position or time produces similar results. Following, the merged data sets are compared. For example, as shown at block 1106, an absolute value of a difference between a sensor's reading merged from position coordinates and a sensor's reading merged from time coordinates can be determined. Specially, data can be merged based on position to obtain an interpolated attribute zx and based on time to obtain an interpolated attribute value zt. Then, if the absolute value of the difference between zx and zt exceeds a threshold value, as shown at block 1108, then it is likely that an error has been made within one of the merging processes, as shown at block 1110. Therefore, the processes can be repeated.

IV. Multiple Flight Survey Data Synchronization

At times, multiple flight survey data synchronization is required. For example, a geologic survey may be completed over the course of several days, and thus by means of several survey flights. In addition, multiple flights may occur simultaneously to collect data. In this second instance, data collected from sensors cannot be synchronized based on time stamps. Thus, data from multiple survey flights is synchronized based on their tagged position coordinates.

Figure 12:
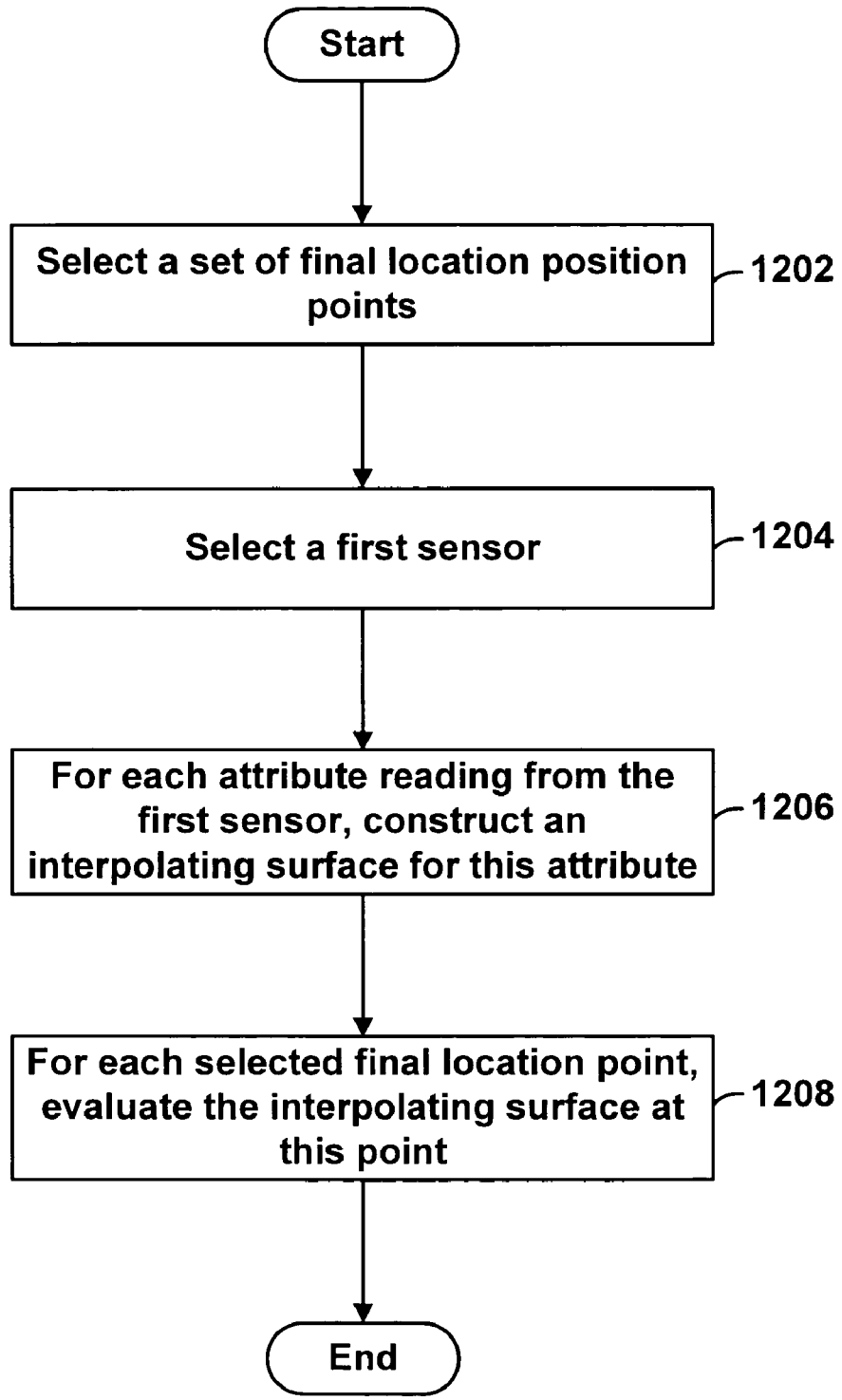
FIG. 12 is a flowchart depicting one embodiment of a method for synchronizing data recorded from multiple surveys.

FIG. 12 is a flowchart depicting one embodiment of a method for synchronizing data recorded from multiple surveys. Initially, a set of final location position points is selected, as shown at block 1202. Next, a first sensor is selected, as shown at block 1204. For each attribute reading from the first sensor, an interpolating surface for this attribute is constructed, as shown at block 1206. For example, using three pairwise collinear data points (e.g., two points with the same x value and two points with the same y value) $p_1=(x1, y2, z1)$, $p_2=(x2, y2, z2)$, and $p_3=(x1, y3, z3)$, the surface can be constructed. (Note: in the two-dimensional interpolation mentioned above, x is the independent variable and a is the attribute and dependent variable. The altitude z is a constant since the data is collected from instruments on the same aircraft). Here, x and y are independent variables and z is the attribute or dependent variable. Since any three non-colinear points determine a plane in three-space, a plane is fit to these points and evaluated at an interior point. This plane is the "interpolating surface." A formula for the plane is give Equation (4) below:

$$z(x,y)=A(x-x_1)+B(y-y_1)+C \quad \text{Equation (4)}$$

The constants A, B, and C can be determined as follows. From the first and last points, the change in x is zero. Thus, $$B = \frac{\Delta z}{\Delta y}$$

is the slope of this section and is constant for all of the sections with x fixed at any value. Similarly, using the first and second points, $$A = \frac{\Delta z}{\Delta x}$$

and is constant for all of the sections with y fixed at any value. Last, using one of the points, the third constant C is determined.

For each selected final location point, the interpolating surface is evaluated at this point, as shown at block 1208. For example, given some point (x,y), the z(x,y) coordinates can be determined using Equation (4), and thus data can be interpolated at the given (x,y) coordinates. In this manner, data can be projected at selected points to synchronize data recorded from multiple survey flights. It should be understood that other interpolation methods may be used as well.

It is intended that the foregoing detailed description be regarded as illustrative rather than limiting, and it is intended to be understood that the following claims including all equivalents define the scope of the invention.

What is claimed is:

1. A method for processing geophysical data comprising:
receiving first geophysical data collected from a first geophysical sensor, wherein each data within the first geophysical data is associated with first position data corresponding to a respective location where the data within the first geophysical data was collected;
receiving second geophysical data collected from a second geophysical sensor, wherein each data within the second geophysical data is associated with second position data corresponding to a respective location where the data within the second geophysical data was collected;
merging the first geophysical data with the second geophysical data based on the first position data and the second position data to obtain a merged data set; and
storing the merged data set,
wherein at least one of the first geophysical sensor and the second geophysical sensor is a full tensor gradiometer.

2. The method of claim 1, wherein each data within the first geophysical data is further associated with first time data corresponding to a respective time when the data within the first geophysical data was collected, and each data within the second geophysical data is further associated with second time data corresponding to a respective time when the data within the second geophysical data was collected, and wherein the method further comprises:
merging the first geophysical data with the second geophysical data based on the first time data and the second time data to obtain a second merged data set.

3. The method of claim 2, further comprising comparing the merged data set and the second merged data set.

4. The method of claim 3, wherein comparing the merged data set and the second merged data set comprises determining if a magnitude of a difference between a value from the merged data set and a value from the second merged data set exceeds a threshold value.

5. The method of claim 1, wherein receiving first geophysical data comprises receiving the first geophysical data collected from a first geophysical sensor on a first aircraft, and wherein receiving second geophysical data comprises receiving the second geophysical data collected from a second geophysical sensor on a second aircraft.

6. The method of claim 5, wherein merging the first geophysical data with the second geophysical data comprises merging the first geophysical data collected from the first geophysical sensor on the first aircraft with the second geophysical data collected from the second geophysical sensor on the second aircraft.

7. The method of claim 1, wherein the first geophysical data includes the first position data and the second geophysical data includes the second position data.

8. The method of claim 1, wherein merging the first geophysical data with the second geophysical data based on the first position data and the second position data comprises interpolating the second geophysical data onto the first position data.

9. The method of claim 8, wherein interpolating the second geophysical data onto the first position data comprises:
selecting a first data point from the first position data;
identifying the nearest two readings to the first data point in the second geophysical data based on the second position data; and
projecting a geophysical data point onto the first data point.

10. The method of claim 9, wherein projecting the geophysical data point onto the first data point comprises calculating an attribute value for the geophysical data point at a given position coordinate of the first data point using the following equation:

$$a = a_1 + \frac{(a_2 - a_1)(x - x_1)}{x_2 - x_1}$$

where a is the attribute value, $x_1$ and $x_2$ are x position coordinates of the nearest two readings, $a_1$ and $a_2$ are attribute values of the nearest two readings at $x_1$ and x2, and x is the given position coordinate of the first data point.

11. A computer readable medium having stored therein instructions for causing a central processing unit to execute the following steps:
receiving first geophysical data collected from a first geophysical sensor, wherein each data within the first geophysical data is associated with first position data corresponding to a respective location where the data within the first geophysical data was collected;
receiving second geophysical data collected from a second geophysical sensor, wherein each data within the second geophysical data is associated with second position data corresponding to a respective location where the data within the second geophysical data was collected;
merging the first geophysical data with the second geophysical data based on the first position data and the second position data to obtain a merged data set; and
storing the merged data set,
wherein at least one of the first geophysical sensor and the second geophysical sensor is a full tensor gradiometer.

12. A method for processing geophysical measurements comprising:
receiving first geophysical data recorded from a first geophysical survey flight, wherein each data within the first geophysical data includes first position data corresponding to a respective location where the data within the first geophysical data was collected;
receiving second geophysical data recorded from a second geophysical survey flight, wherein each data within the second geophysical data includes second position data corresponding to a respective location where the data within the second geophysical data was collected;
merging the first geophysical data with the second geophysical data based on the first position data and the second position data to obtain a merged data set; and
storing the merged data set,
wherein a portion of the first geophysical data is collected from a first geophysical sensor and a portion of the second geophysical data is collected from a second geophysical sensor, and wherein at least one of the first geophysical sensor and the second geophysical sensor is a full tensor gradiometer.

13. The method of claim 12, wherein the first geophysical survey flight occurs during a first time period and the second geophysical survey flight occurs during a second time period.

14. The method of claim 12, wherein merging the first geophysical data with the second geophysical data based on the first position data and the second position data comprises:
generating an interpolating surface for each data point in the first geophysical data; and
evaluating the interpolating surface at each data point of the second position data.

15. A computer readable medium having stored therein instructions for causing a central processing unit to execute the following steps:
receiving first geophysical data recorded from a first geophysical survey flight, wherein each data within the first geophysical data includes first position data corresponding to a respective location where the data within the first geophysical data was collected;
receiving second geophysical data recorded from a second geophysical survey flight, wherein each data within the second geophysical data includes second position data corresponding to a respective location where the data within the second geophysical data was collected;
merging the first geophysical data with the second geophysical data based on the first position data and the second position data to obtain a merged data set; and
storing the merged data set,
wherein a portion of the first geophysical data is collected from a first geophysical sensor and a portion of the second geophysical data is collected from a second geophysical sensor, and wherein at least one of the first geophysical sensor and the second geophysical sensor is a full tensor gradiometer.

16. A method for processing geophysical data comprising:
collecting first and second geophysical data using a sensor;
associating position coordinates to each collected geophysical data point of the first and second geophysical data, wherein the position coordinates correspond to a respective location where each collected geophysical data point was collected;
merging the first and second geophysical data based on respective position coordinates associated with the first and second geophysical data to obtain a merged data set by interpolating the second geophysical data onto the position coordinates of the first geophysical data; and
storing the merged data set.

17. The method of claim 16, wherein associating position coordinates to each collected geophysical data point of the first and second geophysical data comprises recording into memory location coordinates when a geophysical data point is collected.

18. The method of claim 16, further comprising storing the first and second geophysical data and position coordinates associated with the first and second geophysical data into memory.

19. A system comprising:
   a geophysical instrument system for collecting geophysical data of a geographical area, wherein the geophysical data comprises (i) first geophysical data associated with first position data corresponding to a respective location where each data within the first geophysical data was collected, and (ii) second geophysical data associated with second position data corresponding to a respective location where each data within the second geophysical data was collected; and
   a processing unit for merging the first geophysical data with the second geophysical data based on the first position data and the second position data,
   wherein the first geophysical data is collected from a first geophysical sensor in the geophysical instrument system and the second geophysical data is collected from a second geophysical sensor in the geophysical instrument system, and wherein at least one of the first geophysical sensor and the second geophysical sensor is a full tensor gradiometer.

20. The system of claim 19, wherein the geophysical instrument system and the processing unit are co-located.

21. The system of claim 19, wherein the geophysical instrument system is positioned within a geophysical survey data vessel and the processing unit is located at a central office.

22. The system of claim 19, further comprising data transmission means for transmitting the first geophysical data and the second geophysical data from the geophysical instrument system to the processing unit.

23. An aircraft for making geophysical measurements comprising:
   a strap-down inertial navigation system for providing navigational measurements in a frame of reference of the aircraft; and
   a geophysical instrument system including an inertial navigation system for providing navigational measurements in a frame of reference of the geophysical instrument system, wherein the inertial navigation system is decoupled from the aircraft such that the inertial navigation system is in a gimbaled assembly and provides measurements in the frame of reference for the geophysical instrument system,
   wherein the geophysical instrument system includes instruments selected from the group consisting of a radar altimeter, a gradiometer, a magnetic sensor, a light detection and ranging (LIDAR) sensor, a electromagnetic sensor, and a differential global positioning system (DGPS) sensor, and wherein the radar altimeter, the gradiometer, the magnetic sensor, the LIDAR sensor, and the electromagnetic sensor are each connected to the DGPS to receive position information to tag geophysical data with position coordinates corresponding to locations at which the geophysical data was collected.

24. The aircraft of claim 23, wherein the strap-down inertial navigation system is rigidly fixed to the aircraft.

25. The aircraft of claim 23, wherein at least one of the radar altimeter, the LIDAR sensor, or the magnetic sensor uses the navigational measurements in the frame of reference of the aircraft from the strap-down inertial navigation system.

26. The aircraft of claim 23, wherein the gradiometer includes the inertial navigation system for providing navigational measurements in the frame of reference of the geophysical instrument system.

27. The aircraft of claim 23, wherein the LIDAR includes the strap-down inertial navigation system for providing navigational measurements in the frame of reference of the aircraft.

* * * * *